3,505,082
SALT SUBSTITUTE COMPOSITION

Howard C. Miller, Mount Prospect, Ill., assignor to Morton International, Inc., Chicago, Ill., a corporation of Delaware No Drawing. Filed June 12, 1967, Ser. No. 645,509
Int. Cl. A23l 1/22

U.S. Cl. 99—143      9 Claims

ABSTRACT OF THE DISCLOSURE

A sodium-free dietary substitute composition for table salt comprising a major proportion of potassium chloride and a minor proportion of fumaric acid being characterized by the relative freedom of bitter after-taste, corrosiveness, hygroscopicity and deliquescence.

BACKGROUND OF THE INVENTION

It is well known that in certain cardiac and renal conditions, particularly when associated with edema, hypertension, arteriosclerosis, pregnancy complications and epilepsy, the diet must be salt-free in order to avoid further damage and to ameliorate these conditions to the extent that control of diet can do so. It is further known that the deleterious action of common table salt is due to the sodium content thereof, since it is the sodium in the form of sodium ions which must be specifically avoided. Further, the tendency of the sodium content in the diet to cause an accumulation of fluids with a corresponding increase in weight by the body tissues has emphasized the importance of reducing the sodium intake in reducing diets.

Salt hunger seems to be a primary instinct, shared by all men and many of the animals. It is such an important part of our taste that to most people, if not to all, food without salt is tasteless, "flat," and unpalatable. Thus the necessity for adhering to a saltness diet imposes a very genuine hardship on persons suffering from such pathological conditions. Added to this sensuous hardship may be an impairment of health by reason of the fact that unpalatable food is not as easily ingested as that which is enjoyed.

Many attempts have been made to provide saline tasting compositions as a substitute for table salt in trying to overcome the general lack of palatability of the "salt free" diets. As examples of such substitutes there may be mentioned ammonium chloride, potassium chloride, and mixtures thereof and/or with other substances. The use of these chlorides, and particularly combinations of them leaves much to be desired as to taste. Neither of them tastes like sodium chloride. Each alone has a disagreeable taste, and so also do both taken together, with the resulting tendency to discourage continued voluntary use. Potassium chloride per se leaves an after-taste which is usually characterized as bitter by most people. Ammonium chloride also has a bitter aftertaste, and in addition when ingested disturbs the acid-base balance in the blood, produces acidosis and stimulates the bronchial mucosa causing excess mucous secretion and coughing. It must be eliminated by the body as urea thus putting a strain on the liver and the kidneys. At cooking and baking temperatures ammonium chloride decomposes readily thereby changing the pH value, taste and other properties of the food containing it.

To mask or overcome the bitter taste of potassium chloride a variety of diluents, additives or adjuncts have been proposed. Among the many additives which have been employed are potassium and calcium formate, magnesium citrate, dipotassium succinate and a variety of citrates, tartrates, gluconates, ascorbates, cyclamates, glutamates and ion exchange resins. One drawback inherent in the use of these additives is that they have not completely overcome the characteristic bitter aftertaste of potassium chloride, nor have they produced a salt substitute with an acceptable saline taste.

For a salt substitute to be commercially acceptable, properties other than those mentioned above will also be necessary. One such property is that it must be free flowing even after long periods of storage. Another is that it must be non-corrosive.

Non-corrosiveness is needed because of the convenience package, a one portion container which has become widely used in hospitals, institutions and restaurants throughout the country. These packages usually have an aluminum foil lining and for this reason cannot be used with corrosive substances. The various additives that have been suggested and used in the prior art as adjuncts to potassium chloride have not been a commercial success mainly because of their characteristic deliquescence and corrosiveness. Two salt substitutes, one comprising glutamic acid and potassium chloride and the other comprising citric acid and potassium chloride were field tested over a period of many months and both were found to be unsatisfactory. The deliquescence of the citric acid potassium chloride combination caused caking, and the glutamic acid potassium chloride combination was so corrosive that it actually ate holes in the aluminum lining of its packages.

Accordingly, in one broad form, the foregoing and other objects of this invention are attained by a composition which comprises on a relative proportion basis from about 80 to 99% by weight of potassium chloride and from about 1 to 20% by weight of fumaric acid. To state the weight relationships differently the compositions of this invention comprise .01 to .25 part of fumaric acid per part of potassium chloride. In one preferred embodiment of the present invention the composition comprises on a relative proportion basis from about 95 to 99% by weight of potassium chloride and from about 1 to 5% by weight of fumaric acid. This corresponds to from about .01 to .05 part of fumaric acid per part of potassium chloride. In another preferred embodiment of the present invention the composition also includes a minor proportion of an anticaking agent selected from the group consisting of sodium silico aluminate, colloidal silica, and tricalcium phosphate. The anticaking agent is present in an amount of about .005 to about .066 part of anticaking agent per part of potassium chloride or on a relative proportion basis from about .5% to about 5%. The amount of potassium chloride will then calculate to about 75% to 98½% by weight on a relative proportion basis. In a most preferred form the fumaric acid is present in amounts of from .01 to .02 part per part of potassium chloride and anticaking agent from .005 to .02 part per part of potassium chloride. This corresponds to from about 96 to 98.5% potassium chloride, 1 to 2% fumaric acid and .5 to 2% anticaking agent. The particle size of the potassium chloride and fumaric acid should fall within the size range of 150 to 600 microns (U.S. mesh 30 to 100).

BRIEF DESCRIPTION OF THE INVENTION

The surprising and unexpected nature of this discovery can be appreciated by references to the literature which abundantly reports the fact of the bitter after-taste of potassium chloride and the multiplicity of additives other than fumaric acid which have unsuccessfully been used to ameliorate this unpleasant taste. The fact that a combination of potassium chloride and fumaric acid in the indicated proportions had relatively no bitter after-taste and at the same time was both noncorrosive and non-deliquescent was unexpected and entirely unpredictable.

Fumaric acid used in the specified concentrations overcomes the bitter taste without the distinct acid taste appearing. Since fumaric acid has a relatively low solubility, large amounts can be used without producing the acid taste.

The following tests and specific examples illustrate the various embodiments which can be prepared in accordance with the teachings of this invention.

(I) SALT SUBSTITUTE PREFERENCE TEST

Objective

The purpose of this test was to determine, in a blind test, the taste preference among leading salt substitutes.

Procedure

A preferred embodiment of the present invention was compared with two commercial salt substitutes designated items A and B. Items A and B contained 96% potassium chloride, 2% glutamic acid and 2% of anticaking agents and other additives such as potassium iodide, tricalcium phosphate and potassium glutamate. The composition of this invention contained 96% potassium chloride, 2% fumaric acid and 2% tricalcium phosphate (anticaking agent). The products were all in identical salters and identified by the foregoing letters. The taste comparison employed cantaloupe cubes. Panelists were instructed to take a sip of cold tea, salt a cantaloupe cube and eat it; and then repeat the procedure. After tasting both salt substitutes, the panelist wrote the code letter of the preferred salt substitute on the form provided. Then each panelist proceeded to the second table and repeated the test, using the remaining two salt substitute samples.

After every four comparisons, the product containers were rotated so that each was tested first several times.

Findings

Essentially there were two tests. Each test compared a composition of this invention with a competitor's commercial salt substitute.

SALT SUBSTITUTE PREFERENCE TEST

| Item | A | C | No preference | B | C | No preference |
|---|---|---|---|---|---|---|
| Number times preferred | 11 | 21 | 8 | 15 | 21 | 4 |
| Percent preferred | 27.5 | 52.5 | 20 | 37.5 | 52.5 | 10 |

Conclusion

Product C salt substitute compares favorably with leading commercial brands. When given an equal opportunity to taste Item C and competitive salt substitutes, a majority of panelists preferred Item C.

(II) DELIQUESCENCE TEST

The following ingredients were admixed thoroughly until a homogeneous composition was obtained: potassium chloride 96% by weight, fumaric acid 2% by weight, and tricalcium phosphate 2% by weight. In a laboratory test this new composition was maintained over a saturated NaCl brine at room temperature and at 120° F. and no deliquescence was observed.

(III) FIELD TEST

Under field test conditions a 2% tricalcium phosphate, 2% fumaric acid and 96% potassium chloride salt substitute composition was packaged in a small blister packet made of paper, plastic, and aluminum foil. Again there was no evidence of deliquescence or corrosion.

(IV) TASTE TEST

Samples were made up containing various levels of fumaric acid with potassium chloride to make 100 percent and taste tested as a 5% solution. The results of this test are shown on the following table.

EFFECT OF FUMARIC ACID CONCENTRATION ON TASTE

| Concentration, percent | After taste | Acid taste |
|---|---|---|
| 0.5 | Bitter after-taste | No acid taste. |
| 1.0 | Good after-taste | Do. |
| 2.0 | do | Very slight acid taste. |
| 5.0 | do | Do. |
| 10.0 | do | Do. |
| 15.0 | do | Do. |
| 20.0 | do | Do. |

The above test indicates the preferred concentration of fumaric acid that will relatively overcome the bitter aftertaste of potassium chloride without an accompanying disagreeable acid taste.

(V) FREE FLOW TEST

Polyethylene plastic bags were filled with midget containers of regular table salt and midget containers of a 2% fumaric acid, 2% tricalcium phosphate and 96% potassium chloride salt substitute. These were exposed under two different temperature and humidity conditions. A summary of the test results are shown in the following table.

| | Time in days to become damp and not free-flowing | |
|---|---|---|
| | Regular salt midgets | Salt substitute midgets 2% fumaric acid |
| (1) Plastic bags containing midgets exposed at 90% relative humidity and 100° F | [1] 10 | [1] 10 |
| (2) Plastic bags containing midgets exposed at 99% relative humidity and 74° F | [1] 30 | [1] 30 |

[1] Approx.

Conclusion

The salt substitute of the present invention is relatively as free-flowing and nonhygroscopic as ordinary table salt.

(VI) CORROSION TEST

A sealed jar of midget packages containing 2% fumaric acid, 2% tricalcium phosphate and 96% potassium chloride salt substitute was stored at 100° F. for four weeks. A microscopic examination of material in midget packages showed no acid or chemical attack.

(VII) CORROSION TEST

Midget packages in which the above salt substitute had become damp were placed in a sealed jar and stored at 100° F. After three weeks a microscopic examination showed no significant acid or chemical attack on the foil lines.

(VIII) HYGROSCOPICITY AND DELIQUESCENCE TEST

A carton of 2% fumaric acid, 2% tricalcium phosphate and 96% potassium chloride salt substitute was exposed to 95 to 100% relative humidity for 1 month. Upon examination of the product it was completely free-flowing and in excellent condition.

(IX) TASTE TEST

The following ingredients were admixed thoroughly until a homogeneous composition was obtained: fumaric acid 96%, potassium chloride 2% by weight, colloidal silica 2% by weight.

Taste tests indicate that the above composition is relatively free of bitter after-taste and acid taste.

(X) TASTE TEST

The following ingredients were admixed thoroughly until a homogeneous composition was obtained: fumaric acid 96%, potassium chloride 2% by weight, sodium silica aluminate 2% by weight.

Taste tests indicate that the above composition is relatively free of bitter after-taste and acid taste.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A sodium free dietary-substitute composition for table salt consisting essentially of from .01 to .25 part of fumaric acid per part of potassium chloride, said composition being characterized by the relative freedom from bitter after-taste, corrosiveness, hygroscopicity and deliquescence.

2. The composition of claim 1 wherein the fumaric acid is present in an amount of from .01 to .05 part per part of potassium chloride.

3. The composition of claim 1 wherein the particle size of the potassium chloride and fumaric acid ranges from about 150 to 600 microns.

4. A composition according to claim 1 which includes a minor proportion of an anticaking agent.

5. A composition according to claim 4 wherein the anticaking agent is selected from the group consisting of colloidal silica and tricalcium phosphate.

6. The composition of claim 4 wherein the fumaric acid is present in an amount of from .01 to .25 part by weight and the anticaking agent is present in an amount of from .005 to .066 part by weight per part by weight of potassium chloride.

7. The composition of claim 4 wherein the fumaric acid is present in an amount of from .01 to .02 part by weight and the anticaking agent is present in an amount of from .005 to .02 part by weight per part of potassium chloride.

8. The composition of claim 4 which contains .02 part of fumaric acid and .02 part of tricalcium phosphate per part of potassium chloride.

9. The composition of claim 4 wherein the particle size of the potassium chloride and fumaric acid ranges from about 150 to 600 micons.

References Cited

UNITED STATES PATENTS

| 2,511,804 | 6/1950 | Hall et al. | 99—143 X |
| 2,824,008 | 2/1958 | Perri et al. | 99—143 |

LIONEL M. SHAPIRO, Primary Examiner

D. M. NAFF, Assistant Examiner

U.S. Cl. X.R.

99—140